United States Patent Office 3,355,455
Patented Nov. 28, 1967

3,355,455
CERTAIN PYRIDYL SILANE DERIVATIVES
Loren A. Haluska, Midland, Mich., assignor to Dow Corning Corporation, Midland, Mich., a corporation of Michigan
No Drawing. Filed Aug. 6, 1964, Ser. No. 387,988
5 Claims. (Cl. 260—297)

This application relates to novel organosilicon compounds that are useful as sizing agents, elastomeric materials, etc.

The compounds of this invention include both silanes and siloxanes. Any silane of this invention can be described as being a compound of the formula

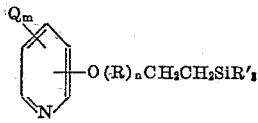

where Q is a lower alkyl radical, R is a divalent radical free of aliphatic unsaturation selected from the group consisting of hydrocarbon radicals and radicals containing carbon, hydrogen, and oxygen in an ether linkage, R' is selected from the group consisting of monovalent hydrocarbon radicals free of aliphatic unsaturation, the hydroxyl group, and hydrolyzable groups, $n$ is an integer of 0 to 1, and $m$ is an integer of 0 to 2.

Q can be any lower alkyl radical such as methyl, ethyl, isopropyl, n-pentyl, or isohexyl.

R can be any divalent radical, as defined above, such as methylene, ethylene, propylene, decylene, octadecylene, 2,5-octylene,

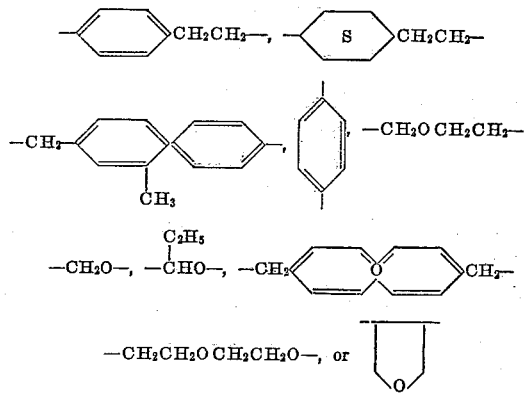

R' can be any monovalent hydrocarbon radical free of aliphatic unsaturation; e.g. alkyl groups such as methyl, ethyl, isopropyl, n-hexyl, 2-ethylhexyl and octadecyl; cycloaliphatic groups such as cyclohexyl and cyclopentenyl; and aromatic-containing groups such as phenyl, tolyl, benzyl, β-phenylpropyl, xenyl and naphthyl. R' can also be the hydroxyl group or any hydrolyzable groups known to the art; e.g., lower alkoxy groups such as methoxy, ethoxy, isopropoxy, butoxy or isohexoxy; alkoxyalkoxy groups such as β-methoxyethoxy, β-ethoxyethoxy, and $$O(CH_2CH_2O)_3CH_3$$

acyloxy groups such as formate, acetate, propionate or butyrate; ketoxime groups such as

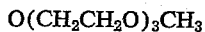

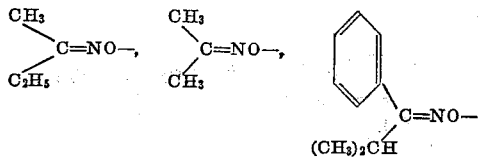

or

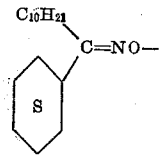

halogen groups: F, Cl, Br, or I; or the isocyanate group.

The siloxanes of this invention are polymeric compositions containing at least one unit of the formula:

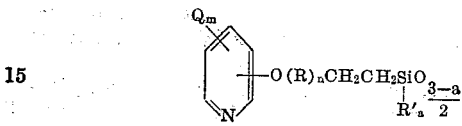

where Q is a lower alkyl radical, R is a divalent radical, free of aliphatic unsaturation, selected from the group consisting of hydrocarbon radicals and radicals containing carbon, hydrogen, and oxygen in an ether linkage, R' is selected from the group consisting of monovalent hydrocarbon radicals free of aliphatic unsaturation, the hydroxyl group, and hydrolyzable groups, $n$ is an integer of 0 to 1, and $m$ and $a$ are integers of 0 to 2, any other units present being of the formula $$Z_bSiO_{\frac{3-b}{2}}$$

where Z is selected from the group consisting of monovalent hydrocarbon and halohydrocarbon radicals, and $b$ is an integer of 0 to 3.

Examples of Q, R, and R' are given above.

Z can be any monovalent hydrocarbon radical; e.g., alkyl radicals such as methyl, ethyl, isopropyl, n-hexyl, 2-ethylhexyl, and octadecyl; unsaturated radicals such as vinyl, ethynyl, allyl, butadienyl, or 5-hexenyl; cycloaliphatic radicals such as cyclohexyl or cyclopentenyl; and aromatic containing radicals such as phenyl, tolyl, benzyl, β-phenylpropyl, xenyl or naphthyl. Z can also be any monovalent halohydrocarbon radical; e.g. haloalkyl such as chloromethyl, 3,3,3-trifluoropropyl, β-(perfluoroheptyl) ethyl, or 4-bromohexyl; unsaturated radicals such as 3-chloroallyl or 4,4-difluorobutadienyl; cyclohaloaliphatic radicals such as chlorocyclohexyl or iodocyclopentenyl; and aromatic-containing radicals such as fluorophenyl, α,α,α-trifluorotolyl, or chlorobenzyl.

The silanes of this invention can be made by reacting

with HSiR'$_3$ in the presence of a platinum catalyst such as chloroplatinic acid and a suitable solvent such as xylene. If desired, a vinyl polymerization inhibitor such as hydroquinone can also be added.

The reaction is:

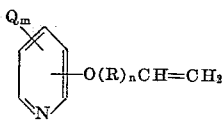

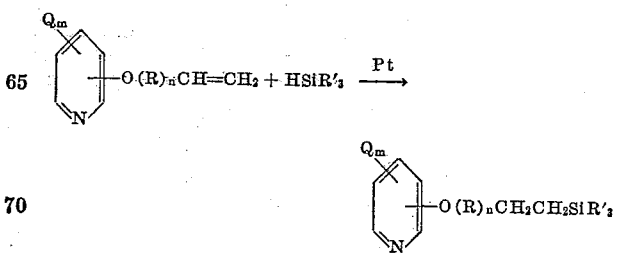

When *n* is zero, a —CH₂CH₂— group connects the pyridyloxy group to the silicon atom, i.e.

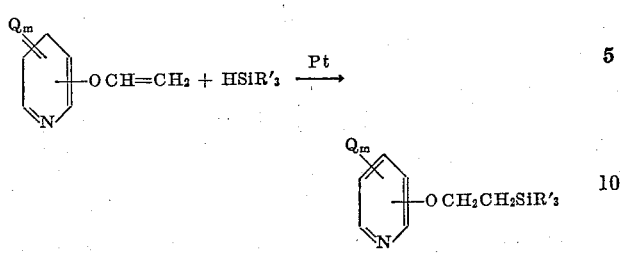

Elevated temperature accelerates the reaction, but temperature, pressure, and proportion of reactants all are not critical. It is, however, desirable to use such pressure that the reaction temperature is below the boiling point of the reactants.

The siloxanes of this invention can be made by hydrolyzing and condensing silanes of this invention which contain hydrolyzable R' groups. This hydrolysis reaction is well-known to the art.

A pure form of silane can be hydrolyzed to form siloxane homopolymers, or mixtures of silanes can be hydrolyzed to form siloxane copolymers. More than one species of silane of this invention can be cohydrolyzed, if desired, as can also other known silanes of the formula $Z_bSiR'_{4-b}$ where Z and b are defined above, and R' is a hydrolyzable group, as defined above.

The siloxanes of this invention can also be made by reacting

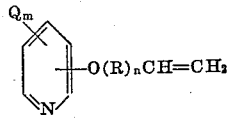

with a siloxane which contains silicon-bonded hydrogen in the presence of a platinum catalyst. This type of reaction is illustrated in the examples below.

The silanes of this invention are suitable as sizing agents and surfactants, while the siloxanes of this invention are useful thermoplastic, elastomeric, and resinous materials.

The following examples are illustrative only and should not be construed as limiting the invention, which is properly delineated in the appended claims.

Example 1

A composition consisting of 270.3 g. of 2-allyloxypyridine, 268.5 g. of methyldiethoxysilane, 248.6 g. of xylene, and 2.0 g. of a solution of chloroplatinic acid in dimethylphthalate (1% by weight platinum) was refluxed at 130° to 143.5° C. for 27 hours.

On distillation there was recovered 198.9 g. of

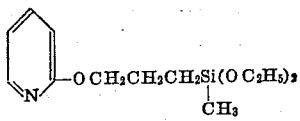

which has a boiling point of 165° C. at 20 mm. Hg pressure, a viscosity at 25° C. of 3.92 cs. and an $n_D^{25}$ of 1.4691.

A portion of this product was placed in a container with a large excess of distilled water and a small amount of KOH. On heating at 100° C. for about 12 hours, a viscous oil was formed which was a homopolymer comprising

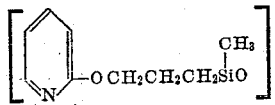

units.

Example 2

One mol (222 g.) of bis-[trimethylsiloxy]methylsilane was heated to 96° C. with 1 g. of chloroplatinic acid in isopropanol (1% Pt).

2-allyloxypyridine was added dropwise, the temperature being allowed to rise to 123° C., until one mole (135.5 g.) had been added.

The mixture was then refluxed at 140° C. for 12 hours. A sizable yield of

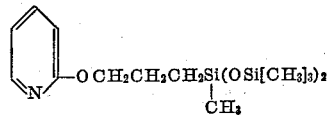

was recovered.

Example 3

To 294.7 g. of phenyldimethylsilane, 2.3 g. of chloroplatinic acid in isopropyl alcohol (1% Pt), and 318 g. of xylene, there was added about 279 g. of 2-allyloxypyridine.

The mixture was refluxed for 42 hours from 120° to 150° C.

On distillation, 118 g. of

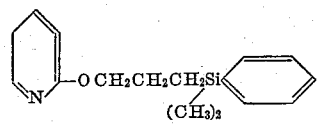

were recovered, as determined by nuclear magnetic resonance and infra-red spectra.

Example 4

When 0.2 mole of

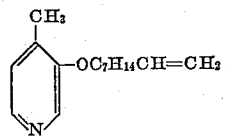

is heated with 0.1 mole of

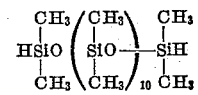

in the presence of platinum, a compound of the formula

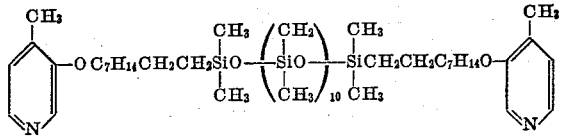

is produced.

Example 5

When 0.1 mole of

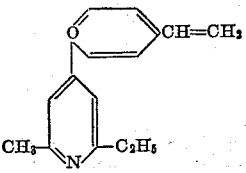

is heated with 0.1 mole of

HSi(OCH₃)₂
    |
    Cl in the presence of plantinum, a compound of the formula

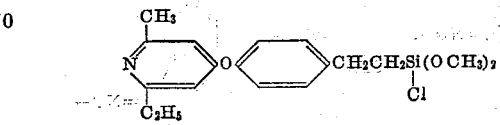

is formed.

That which is claimed is:

1. A compound of the formula

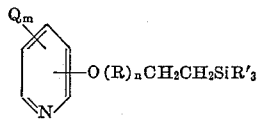

where Q is a lower alkyl radical, R is a divalent radical having from 1 to 18 inclusive carbon atoms, free of aliphatic unsaturation, selected from the group consisting of hydrocarbon radicals and radicals containing carbon, hydrogen, and oxygen in an ether linkage, R' is selected from the group consisting of monovalent hydrocarbon radicals free of aliphatic unsaturation having from 1 to 18 inclusive carbon atoms, the hydroxyl group, and hydrolyzable groups selected from the group consisting of lower alkoxy groups, alkoxyalkoxy groups, acyloxy groups, ketoxime groups, halogen groups and isocyanate groups, $n$ is an integer of 0 to 1, and $m$ is an integer of 0 to 2.

2.

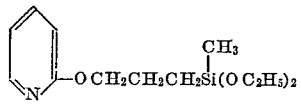

3.

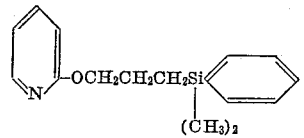

4. The composition of claim 1 where R is methylene.
5. The composition of claim 1, where at least 2 R' groups are hydrolyzable groups.

References Cited
UNITED STATES PATENTS

| | | | |
|---|---|---|---|
| 3,208,972 | 9/1965 | Lyons | 260—46.5 |
| 3,215,666 | 11/1965 | Simmler | 260—46.5 |
| 3,218,330 | 11/1965 | Duesel et al. | 260—297 |
| 3,223,710 | 12/1965 | Greenhalgh et al. | 260—297 |

JOHN D. RANDOLPH, *Primary Examiner.*

WALTER A. MODANCE, *Examiner.*

R. T. BOND, A. L. ROTMAN, *Assistant Examiners.*

UNITED STATES PATENT OFFICE
CERTIFICATE OF CORRECTION

Patent No. 3,355,455                        November 28, 1967

Loren A. Haluska

It is hereby certified that error appears in the above numbered patent requiring correction and that the said Letters Patent should read as corrected below.

Column 4, lines 58 to 64, the formula should appear as shown below instead of as in the patent:

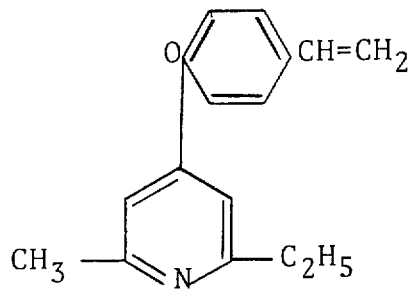

Signed and sealed this 6th day of May 1969.

(SEAL)
Attest:

EDWARD M. FLETCHER, JR.
Attesting Officer

Commissioner of Patents